Patented Mar. 26, 1929.

1,706,566

UNITED STATES PATENT OFFICE.

BAYLIS M. DAWSON, OF BROOKLYN, NEW YORK, ASSIGNOR TO THE FLEISCHMANN COMPANY, OF NEW YORK, N. Y., A CORPORATION OF OHIO.

YEAST COMPOSITION.

No Drawing.  Application filed June 30, 1922. Serial No. 572,089.

My invention relates to compositions containing yeast and more particularly to compositions of nutritive and medicinal value comprising yeast and a malt extract intimately combined and preferably in dry finely comminuted condition.

In carrying out my invention fresh compressed yeast (preferably differing only from the ordinary yeast of commerce in that it contains no starch or other similar amylaceous admixture) is mixed with a sufficient quantity of a malt extract (for example a malt extract of high diastatic activity and containing about 80% of solids) and water or other suitable diluent to form a liquid mixture of sufficient fluidity to be capable of ready atomization and this mixture is then subjected to desiccation suitably by spray drying. For this purpose the mixture may be atomized into the upper portion of a drying chamber at one side of the chamber while air of appropriate temperature for effecting the desiccation is forced into the drying chamber from the opposite side of its upper portion and the particles of the atomized liquid mixture thus coming into contact with the current of air give up to the latter for the most part their content of moisture as they pass through the drying chamber and are finally reduced to a dry condition and may be collected in the form of a powder by permitting them to gravitate into a hopper at the bottom of the drying chamber or by collecting them in any other suitable manner. If desired an auxiliary current of air may be blown into the drying chamber at a level below that at which the atomized liquid and first-mentioned air supply are introduced and the air of increased moisture content which has effected the drying of the particles may be withdrawn from the drying chamber by a suitable outlet which may be placed upon the opposite side of the drying chamber from the inlet of auxiliary air and at about the same level as the auxiliary air inlet. If the desiccated product is collected in a hopper at the bottom of the drying chamber this hopper will preferably be placed at a level sufficiently below that of the auxiliary air inlet and of the air outlet as to permit an efficient settling zone such as to avoid any considerable portion of the desiccated product being carried away with the current of air passing out from the drying chamber.

The temperature of the air supplied to the chamber and which comes into contact with the yeast in the initial drying zone (for example in the upper portion of the drying chamber as described) may be as high as 100° C. or even higher if it is not desired to preserve the viability of the yeast cells to the greatest possible extent. However, if it is desired to preserve the viability of the yeast cells to a maximum extent or if it is desired to avoid as far as possible any alteration in the composition of the malt extract employed which might result from undue heating and drying may be effected by introducing air at a considerably lower temperature, for example 50° C. or even lower, and it will of course be apparent that whatever the temperature of the air at the point of its introduction into the chamber this temperature will be reduced considerably even in the initial drying zone by reason of the heat consumed in the evaporation of moisture from the mixture. If an auxiliary supply of air is introduced into the drying chamber as above referred to, this auxiliary supply of air may be introduced either at a lower or higher temperature than that prevailing in the drying zone from which the desiccated or partially desiccated particles pass into the zone to which the auxiliary air is supplied. For example if the air supplied to the initial drying zone has a temperature of 50° C. at the point of its entry into the drying chamber the actual temperature in the initial drying zone may be as low as 30–35° C. in which case the auxiliary air may be supplied at a temperature slightly higher than this, for example 35–40° C.

In carrying out this process an apparatus of the general type disclosed in U. S. Patent No. 1,090,740 to Wharton B. McLaughlin, issued March 17, 1914, may be suitably employed, although my invention is not limited to the employment of this particular type of apparatus nor to the particular method of operating described in said patent. In drying the yeast mixture I have also found that good results are obtained by atomizing the yeast mixture horizontally into the upper portion of a rectangular drying chamber about 4 ft. by 7½ ft. in cross section and 8 ft. high or preferably higher into which is also passed a current of air or other drying gas entering near the top of the chamber and preferably opposite to the point of entry of the yeast mixture, such current of air or other gas suitably entering through a long narrow horizontal slot and having a temperature at the point of entry of 45–100° C. Near the bottom of the drying chamber and suitably upon the same side of the chamber as that into which the yeast mixture is atomized an outlet is provided for the air or other gas which has been used in the desiccation and if desired there may be provided near the bottom of the drying chamber and suitably at a location approximately opposite to the outlet opening just mentioned an inlet opening for auxiliary air or other drying gas which may suitably be introduced at a temperature of about 35° C. or somewhat higher and which may serve to facilitate the desired desiccation of the particles of the yeast mixture as they fall through the drying chamber.

Preferably below the level of the outlet opening and opening for auxiliary desiccating gas there is provided a hopper or other suitable device for collecting the dried particles which gravitate from the upper portion of the chamber. In carrying out the process of my present invention I have found that certain substances which are present in malt extract serve as protective colloids which surround the yeast cells and serve to regulate the desiccation of the mixture so that it proceeds without such damage to the vitality of the yeast cells as almost invariably has occurred in heretofore known yeast drying processes.

While the proportions of yeast and malt extract employed in accordance with my invention may as is obvious be varied within wide limits, suitable mixtures for desiccation may for example be formed by the admixture with yeast of from 0.5 to 20 times its weight of a malt extract of the character hereinbefore indicated together with a suitable diluent such as water if necessary to give a mixture of proper fluidity for spraying or atomization. The proportions of yeast and malt extract will of course be susceptible to variation within wide limits in accordance with the use to which the composition is to be put, for example in the preparation of a composition to be used in bread making a considerably higher percentage of yeast might be employed than in the case of a composition for use in the manufacture of a non-alcoholic beverage, and my invention is therefore not limited to any particular proportions in which the ingredients are used but relates generally to the desiccation of any suitable mixture of the character indicated.

When my novel composition, comprising particles of desiccated yeast encapsulated in desiccated solids of malt extract, is employed in the preparation of leavened bread dough, the malt extract associated with and surrounding the yeast particles serves to promote the uniform admixture of the desiccated product with the other ingredients of the bread dough, and, during the mixing of the dough ingredients and also during the subsequent period of conditioning of the dough, preparatory to baking, the malt extract, in the special form in which, in accord with my invention, it is associated with the yeast particles, serves to stimulate and promote the vital activities of the yeast in connection with its leavening action upon the dough. An excess of malt extract, over and above the amount which may be directly utilizable by the yeast, may be used without detriment as such excess, within any reasonable amount, will have also beneficial effects in improving the quality of the bread produced, when compositions as described and claimed in the present application are used as leavening agents.

Fruit juices may if desired be mixed with the yeast and malt extract and dried therewith, for the purpose of improving the palatability of the product and of augmenting its vitamine content by the presence of vitamines derived from fruit juices. Such juices, if added, are preferably used in fresh condition and may be blended with the yeast and malt extract at the point of atomization or just before atomization of the mixture if it be desired to guard against undesired fermentive or other reactions which might occur as an incident to prolonged association of the yeast and other constituents and this same expedient of blending just prior to or at the time of atomizing or spraying may also be employed with advantage in combining the yeast and malt extract even when the fruit juice is not present to preclude undesired enzymic or other reactions between the yeast and constituents of the malt extract. When fruit juices are used, they may be present in any desired proportion. Orange juice to the amount of ten per cent or more of the total weight of the mixture may be used. Other fruit juices such as the juice of pineapples, lemons, limes or grapes may be used in the same or greater or less percentage, by exercising the precaution just described to prevent undue reactivity of the ingredients upon each other prior to the desiccation of mixture.

For convenience in dispensing, the products prepared in accordance with my invention may be formed into compressed tablets or blocks or they may be used in comminuted form as initially obtained as the result of the described desiccation.

In drying a mixture containing malt extract as described, temperatures not materially exceeding 60° C. in the drying zone should be used if it is desired to insure preservation of the diastatic properties of the malt extract.

Up to 10% or more of either the cane sugar or invert sugar may if desired be added to the mixtures hereinbefore described before their desiccation.

In my copending application for U. S. Patent, Serial No. 572,087, filed simultaneously with the present application, I have described another specific procedure of preparing certain novel dried yeast compositions, in which yeast is also associated with certain other substances which would tend to undergo reaction or alteration by prolonged contact, and in which such alteration is substantially avoided by mixing such substances together substantially coincident with their atomization immediately prior to desiccating the substances by contact with an aeroform drying fluid. Generic claims for such method of dessicating such mixtures of yeast and associated reactive substances are presented in my aforesaid application, Serial No. 572,087.

What I claim is:

1. A comminuted and substantially dry composition consisting essentially of yeast particles encapsulated by the solids of a fruit juice and of malt extract.

2. A substantially dry food composition comprising essentially yeast particles encapsulated by malt extract solids and fruit juice solids.

3. A comminuted and substantially dry composition consisting essentially of yeast encapsulated in and associated with malt extract solids and fruit juice solids.

4. A comminuted and substantially dry composition consisting essentially of yeast encapsulated in and associated with malt extract solids and fruit juice solids and containing active enzymes and vitamines.

In witness whereof, I have hereunto signed my name to this specification on the 27th day of June, 1922.

BAYLIS M. DAWSON.